UNITED STATES PATENT OFFICE.

F. C. MENDE AND T. F. MENDE, OF PHILADELPHIA, PENNSYLVANIA.

IMPROVED PROCESS OF MANUFACTURING GERMAN HAND-CHEESE.

Specification forming part of Letters Patent No. 95,500, dated October 5, 1869.

*To all whom it may concern:*

Be it known that we, F. C. MENDE and T. F. MENDE, of the city and county of Philadelphia, State of Pennsylvania, have invented a new and useful Improvement in the Manufacture of Cheese; and we do hereby declare that the following is full, clear, and exact description thereof, which will enable others skilled in the art to make and use the same.

Our process of manufacturing what we term "German hand-cheese" is carried out as follows: We take milk, put it in a room of 80° Fahrenheit, for the cream to rise. After two days we take off the cream, which we do not use. Then we subject the sour milk to a heat of 100° to disunite the whey from the curd. Then we put the curd in a cotton bag and let all the whey drain off. When all the whey is out, we take the curd and let it pass through a machine or mill, where it is mashed to a paste. Now the curd is ready for making cheese. We take of this prepared curd one hundred pounds and mix it with four pounds of salt and one-eighth of a pound of caraway-seed. When this is all well mixed, we divide it by means of a machine into square pieces of one-fourth of a pound each. Then we mold these square pieces by another machine into oval round cakes. These cakes we put on a board eight feet long and fifteen inches wide, for the purpose of drying. This is effected by giving them alternately different degrees of temperature. The first twenty-four hours we subject them to a temperature of 80° Fahrenheit; the second 24 hours to 90°; the third twenty-four hours again to 80° degrees; the fourth twenty-four hours to 75°; the fifth and sixth to 70°. At the end of the sixth day they have arrived at the required and perfect state of dryness. They must not be dried too hard nor too soft. The temperature of 90° is used for the purpose of drawing out the water rapid. When this is effected the lower degrees of heat are employed to bring the cheese to the right state of dryness. By lowering and changing the temperature in the described manner and such time dries them exactly right, and we are therefore entirely independent of all outdoor weather. This drying process by alternate different degrees of heat is a very important part in the process of making this cheese, and we claim it as an invention. After this drying is completed, we take the dry cheeses off the board and wet them with a decoction of juniper-wine and water. This is done to impart a certain flavor to the cheeses and to give them a smooth surface. After this operation we put them on another board edgewise in such a manner that the whole surface is exposed to the action of the air, and put them in a room of 76° heat. This room must have a damp atmosphere, which is effected by infusing steam into it. In this room and in this position we let them remain for seventy-two hours, when they are made wet again with the above-named decoction. Then we let them remain in the same room for seventy-two hours longer. The treatment in this damp room is for the purpose of softening the dry surface to make it smooth and yellow, and it gives them the right consistency of excellent cheese. After this last operation they are finished ready for market and to eat. The whole length of time required is twelve days. The treatment in the last room is of the greatest importance in the whole process of manufacture. Without such treatment it is impossible to make this cheese in so short a time, and we claim it as the principal part of the invention.

What we claim as new, and desire to secure by Letters Patent, is—

1. The within-described process of manufacturing what we term "German hand-cheese" by subjecting the milk and curd to the various successive manipulations above set forth.

2. The product obtained by subjecting milk to the various successive manipulations herein specified, as a new article of manufacture.

F. C. MENDE.
T. F. MENDE.

Witnesses:
ANDW. J. BOSWELL,
W. C. SMITH.